March 2, 1926. Re. 16,278

E. J. BLOOM

SUPPLY INSTALLATION FOR CENTRAL CHASSIS LUBRICATION

Original Filed Feb. 1, 1922 3 Sheets-Sheet 1

INVENTOR

Edgar J. Bloom,

By Drew, Fairbank, Obright & Hirsch his ATTORNEYS

March 2, 1926. Re. 16,278

E. J. BLOOM

SUPPLY INSTALLATION FOR CENTRAL CHASSIS LUBRICATION

Original Filed Feb. 1, 1922 3 Sheets-Sheet 2

INVENTOR

Edgar J. Bloom,

By Drew, Fairbank, Wright & Kirsch

His ATTORNEYS

March 2, 1926. Re. 16,278
E. J. BLOOM
SUPPLY INSTALLATION FOR CENTRAL CHASSIS LUBRICATION
Original Filed Feb. 1, 1922 3 Sheets-Sheet 3
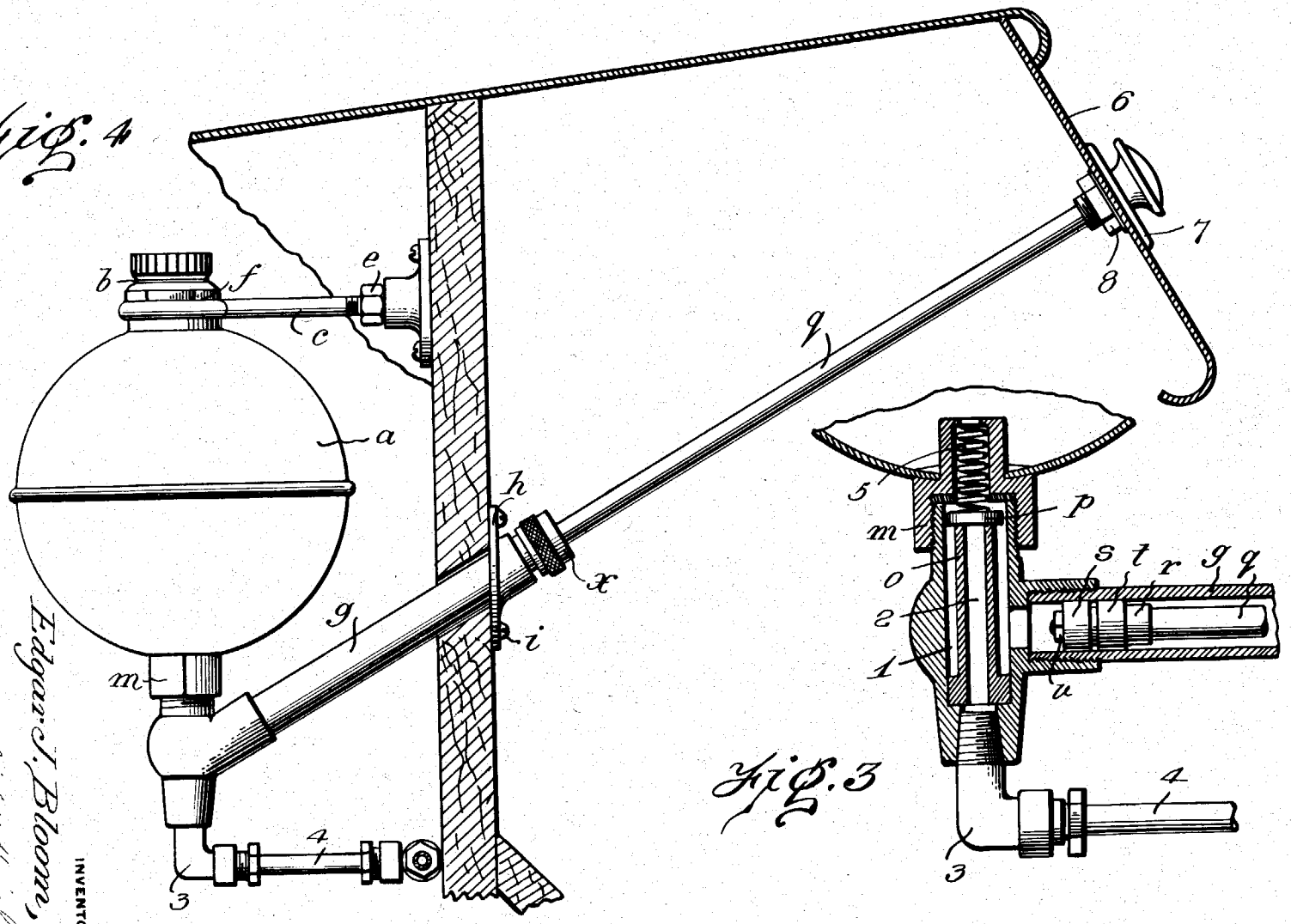
INVENTOR
Edgar J. Bloom,
By Drew, Fairbank, Wright & Hirsch
Its ATTORNEYS Reissued Mar. 2, 1926.

Re. 16,278

UNITED STATES PATENT OFFICE.

EDGAR J. BLOOM, OF TIFFIN, OHIO, ASSIGNOR, BY MESNE ASSIGNMENTS, TO AUTO RESEARCH CORPORATION, A CORPORATION OF NEW YORK.

SUPPLY INSTALLATION FOR CENTRAL CHASSIS LUBRICATION.

Original No. 1,451,861, dated April 17, 1923, Serial No. 533,476, filed February 1, 1922. Application for reissue filed April 17, 1925. Serial No. 23,982.

*To all whom it may concern:*

Be it known that I, EDGAR J. BLOOM, a citizen of the United States, residing at Tiffin, in the county of Seneca and State of Ohio, have invented certain new and useful Improvements in Supply Installations for Central Chassis Lubrication, of which the following is a specification.

This invention relates to pumps and especially to a force pump installation employed as an element in a lubricating system. A new type of chassis lubrication adopted in connection with automobiles provides a central source of oil and flexible conduits conduct this to the various shackle bolts, knuckle pins, etc., that have heretofore been provided with separate grease cups or oil cups. Suitable flexible and swiveling connections are provided to make possible the connection between the chassis frame and the running gear. My installation includes a reservoir supplying lubricant to a force pump associated therewith and serving to force the oil to the lubricating points.

It is an object of the present invention to provide an effective pump installation especially designed for such a system and which can be manufactured at very low cost. However, the pump, as will be apparent, can be used almost anywhere and hence is of wide application.

In the drawings,—

Fig. 3 is a fragmentary vertical cross section of a still further modified form of construction.

Fig. 4 is an elevation of the reservoir and the pump showing the pump arranged to have the plunger operated from the instrument board of the car.

Figure 1:
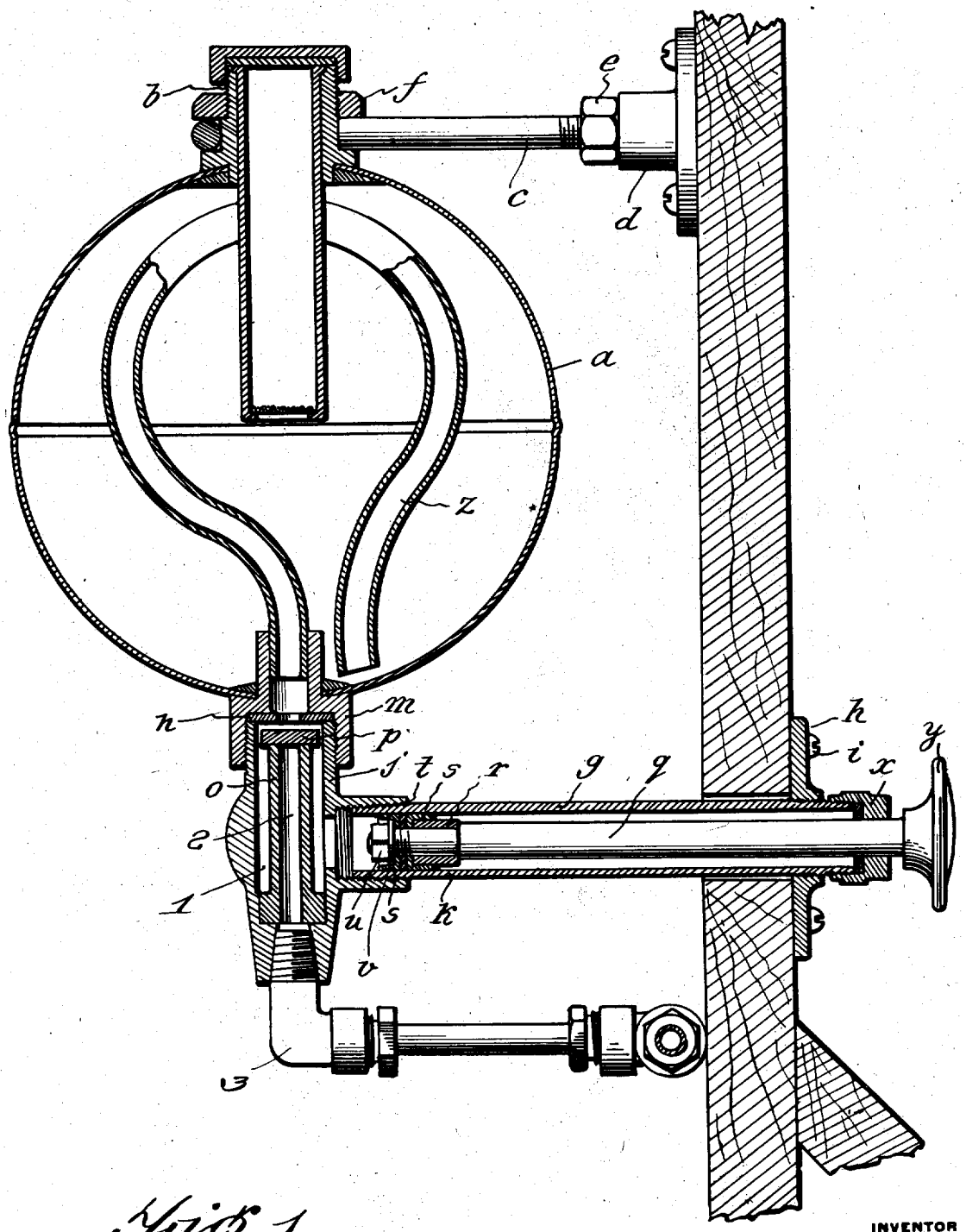
Fig. 1 is a vertical cross section through the pump and reservoir with the plunger rod button on the dash of the car.

*a* designates the oil reservoir which may be simply a sphere provided with a neck portion *b*. The eye bolt *c* screws into the dash fixture *d* and may be locked in any given position by the lock nut *e*. The eye of the bolt fits over the shoulder of the neck to hold the reservoir *a* in any given position. By screwing down the nut *f* the neck of the reservoir is firmly held in spaced relation with respect to the dash. This eye bolt arrangement is a valuable one in connection with the pump *g*. This pump has a flange *h* which can be secured to the inside of the dash by the screws *i*. The end of the pump is shown in the form of a T *j* that screws onto the pump cylinder *k*. Inasmuch as the fitting of the pump T to the pump cylinder and securing the flange to the inside of the dash may vary the amount of protrusion of the pump forward of the dash, it is desirable to have a supporting arrangement for the top of the reservoir which will adjust itself to variations of the pump which supports the reservoir at the bottom.

The pump T *j* has external threads at its top comprising a nipple, upon which is threaded the socket or nut member *m* which is soldered to the bottom of the reservoir *a* and the latter may be considered a part of the T for purpose of reference in the claims. The packing washer *n* fits into the bottom of the socket *m* and onto the end of the T. There is sweated into the bore of the T a vertical tube *o* which is spaced from the walls of the bore for the larger part of its length. On top of this vertical tube is located a metal disk or check valve *p* which has some clearance from the side walls of the bore of the T. The plunger rod is designated *q*. The plunger is made up of a bushing *r* and a pair of leather cup washers *s* having oppositely-directed flanges and spaced by the washer *t*. The bushing *r* engaging the packing washer *y* prevents the cup washers striking the end of the cylinder. By screwing down the nut *u* on the end of the plunger rod against the washer *v*, the plunger is completed. It will be noticed that this is a very cheap and simple construction.

The pump cylinder *k* is simply a short piece of tubing. A cap nut *x* closes the inner end of the pump cylinder and is provided with an orifice to allow the plunger rod *q* to slide therethrough.

One of the important features of this design is that after the plunger has been placed in the cylinder the cup washers are never again disturbed except under unusual circumstances nor are they required to pass an intake opening in the side of the cylinder which is calculated to disturb the cup washers. This type of cup washer, especially where there are two cup washers with oppositely-directed flanges, is easily disturbed and injured. The flanges when stroked the wrong way by running against an obstruction are very difficult to rearrange and easily torn or destroyed. With the type of cylinder and valve arrangement now to be described, it will be seen that there is absolutely no opening and no occasion for ever disturbing the cup washers after they have been assembled into the cylinder. The T, together with the vertical tube, is a relatively cheap construction from a manufacturing standpoint.

When the plunger is drawn toward the operator it tends to create a vacuum in the pump which draws the oil from the reservoir through the goose-neck *z* and down into the well 1 and into the pump cylinder of the pump. This well of the pump is between the wall of the main bore of the T and the wall of the vertical tube *o*. The check valve *p* remains seated over the outlet orifice through the vertical tube because the pressure is on top of the check valve. When the plunger of the pump is reversed the check valve *p* is driven up against the washer *n* because the outer edges of the check valve protrudes beyond the tube *o*. Consequently the first effect of the reversed pressure on the fluid is to force the check valve against the packing washer *n* which constitutes a valve seat therefor, thereby closing the intake and opening the outlet, which permits the fluid to run down through the outlet passage 2 into the elbow 3 and from here by various pipe connections to the points of distribution.

The purpose of the goose-neck is to prevent any oil from leaking out of the reservoir when the pump is not in operation. When the pump is not being used the check valve *p* is held to its seat simply by gravity and in passing over rough roads is jarred up and down so that this would leak under ordinary conditions. Obviously with a goose-neck no oil can leave the reservoir except what is drawn by suction.

Figure 2:
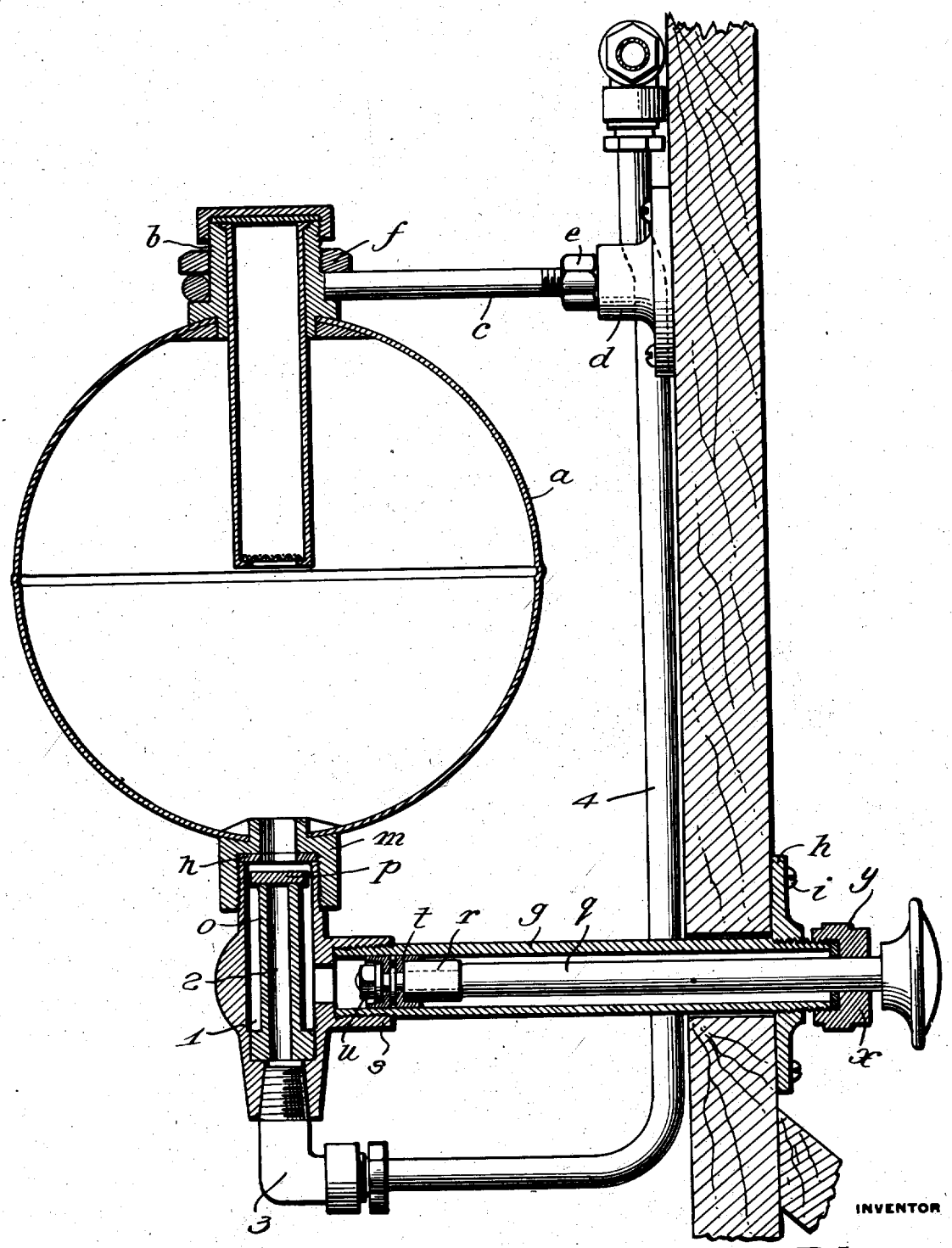
Fig. 2 is a vertical cross section of a modified form of construction, with the plunger rod button on the dash of the car.

Fig. 2 illustrates another way of accomplishing the same purpose. By bringing the distributing pipe 4 up above the oil in the reservoir, this acts as a trap which prevents any oil that might leak through the check valve *p* reaching the parts to be lubricated unless the same is forced thereto by the pump.

Still another way of preventing leakage is shown in Fig. 3, where the check valve *p* is held to its seat by the coiled spring 5.

It is not necessary that the fixture that I have called a T should be precisely formed as a T. The stem of the T may have an oblique disposition, as is shown in Fig. 4, and the pump cylinder may also have an oblique disposition, as shown in this figure. This permits the pump plunger rod *q* to be extended up through the instrument board 6 of the car where it is possibly more convenient for the operator. A suitable flange 7 and nut 8 serves to form a fixture on the instrument board which acts as a guide for the inner end of the plunger rod *q*.

This location of the outlet opening above the plunger gives the fluid an upward course which quickly lifts the valve against its seat over the inlet port. Otherwise this valve movement would be slow. With the edges of the valve overhanging into the well the valve is caught in the upward-flowing fluid and quickly forced against its seat over the intake port.

I claim:—

1. A supply installation for a chassis lubricating system, including a reservoir, a pump cylinder structure having an inlet adjacent to an outlet opening through said reservoir, means adjacent to said inlet mechanically attaching together said reservoir and said pump structure to combine them into a unitary apparatus with the pump cylinder exteriorly of the reservoir, and to effect a substantially lubricant-tight connection for flow of lubricant out of the reservoir into the pump cylinder structure, said apparatus having means serving for mounting thereof upon one side of a dashboard and including a pump plunger having an operating member to protrude through said dash.

2. A supply installation for a chassis lubricating system, including a reservoir, a pump cylinder structure having an inlet adjacent to an outlet opening through said reservoir, means adjacent to said inlet mechanically attaching together said reservoir and said pump structure to combine them into a unitary apparatus with the pump cylinder exteriorly of the reservoir, and to effect a substantially lubricant-tight connection for flow of lubricant out of the reservoir into the pump cylinder structure, a valve near the lower part of said reservoir, a support upon which said valve normally rests in open position, and a seat above said valve against which the latter is urged by lubricant discharging operation of the pump.

3. A supply installation for a chassis lubricating sytem including a reservoir, a pump cylinder structure having an inlet adjacent to an outlet opening through said reservoir, threaded means adjacent said inlet mechanically attaching together said reservoir and said pump structure to combine them into a unitary apparatus with the pump cylinder exteriorly of the reservoir, and to effect a substantially lubricant-tight connection for flow of lubricant out of the reservoir into the pump cylinder structure, said apparatus having means serving for mounting thereof upon one side of a dashboard and including a pump plunger having an operating member to protrude through said dash, a valve near the lower part of said reservoir, a support upon which said valve normally rests in open position, and a seat above said valve against which the latter is urged by lubricant discharging operation of the pump.

4. A supply installation for a chassis lubricating system including a pump cylinder structure having means serving for attachment thereof against the dashboard of a motor vehicle, a reservoir supported upon said pump structure in lubricant-tight communication therewith and extending thereabove, a check valve, a support for the latter carried by said cylinder structure, said valve permitting flow of lubricant from the reservoir toward the pump, and a seat above said valve against which said valve is raised and held by pressure exerted during pump discharge.

5. A supply installation for a chassis lubricating system, including, a pump cylinder structure having an outstanding flange adapted for attachment thereof to the dashboard of an automobile, said structure including an inlet nipple extending thereabove, an outlet extending therebelow, a sheet metal reservoir, a nut securing said reservoir upon said nipple, said nipple having a valve associated therewith, a support upon which said valve normally rests to afford open communication from the reservoir to the pump structure, and a valve seat at said nipple above said valve against which the latter is urged by lubricant discharging operation of the pump.

6. A supply installation for a chassis lubricating system including a pump cylinder structure, a mounting flange thereon at which it may be attached to the dashboard of an automobile, said cylinder having an inlet nipple, a reservoir supported at its bottom upon said pump structure and secured thereto at said nipple and a check valve associated with said nipple normally open for flow of lubricant from said reservoir toward said pump and adapted to seat under discharge pressure by said pump to prevent return of lubricant from said pump to said reservoir.

7. A supply installation for a chassis lubricating system including, a pump cylinder structure having a flange mount near the outer end thereof adapted for attachment to the dashboard of an automobile for disposal of a substantial part of the cylinder structure to the front of the dashboard, a reservoir mounted upon and secured to the pump cylinder structure, a check valve to prevent return of lubricant from the cylinder to the reservoir during discharge of the pump, a pump plunger in said cylinder, and a packing about the pump plunger near the outer end thereof to prevent escape of lubricant from the pump cylinder to the rear of the dashboard.

8. A supply installation for a chassis lubricating system including a pump cylinder having a flange near the rear end thereof for attachment thereof to a dashboard and having a pump rod extending therethrough with an eperating member exposed at the rear thereof, a flow sealing washer carried by the inner end of said pump rod, gasket means at the exposed side of said pump, a nipple extending upward from said pump and affording admission of lubricant thereto, a pipe terminal below said pump for exit of lubricant therefrom, a sheet metal reservoir extending above said nipple, a nut securing said reservoir to said nipple, a gravity-held valve normally opening communication for flow of lubricant from the reservoir into the pump, said valve subject to pressure from said pump during the lubricant discharging stroke thereof to prevent return of lubricant to the reservoir, whereby the charge of lubricant from the pump will be ejected through the pipe terminal outlet.

9. A supply installation for a chassis lubricating system including a pump structure having an upwardly extending inlet nipple therefor and an outlet therefrom, a nut threaded upon said inlet nipple, a sheet metal reservoir supported upon said pump structure and secured thereto by said nut, a filling opening in the top of said reservoir, a strainer therebelow, a valve in said nipple, a support therefor normally affording open communication from said reservoir into said pump cylinder, a portion of said nut extending upward from the bottom of said reservoir.

10. A supply installation for a chassis lubricating system including a reservoir and pump assembly, the pump element thereof having an inlet below the level of the lubricant in the reservoir, said installation having a check valve normally open, and closed by discharge pressure exerted by the pump and preventing return flow to the reservoir, said reservoir having a filling opening and said pump having an operating member for protrusion through a corresponding aperture in the dashboard for actuation by a substantially horizontal thrust.

EDGAR J. BLOOM.